July 17, 1934.

W. A. ABEGG

Re. 19,236

WELL DRILLING BIT

Original Filed Oct. 9, 1928

INVENTOR.
WALTER A. ABEGG.
BY James M. Abbett
ATTORNEY

Reissued July 17, 1934 Re. 19,236

UNITED STATES PATENT OFFICE 19,236

WELL DRILLING BIT

Walter A. Abegg, Los Angeles, Calif., assignor of one-half to Baldwin Reinhold

Original No. 1,828,165, dated October 20, 1931, Serial No. 311,306, October 9, 1928. Application for reissue October 19, 1933, Serial No. 694,241

8 Claims. (Cl. 255—71)

This invention has to do with a drill or boring tool and it is a general object of the invention to provide an improved, effective and practical drilling tool useful generally in the art of drilling and particularly in the drilling of wells with the rotary method.

My present invention has to do, generally, with the type of drill that has one or more rotatable cutting members, and it is an object of the invention to provide a bit of this type in which the cutting members are positively driven or rotated.

Another object of my present invention is to provide a bit of the type mentioned having a positive and direct drive to the rotatable cutters.

It is another object of the invention to provide a bit in which the rotatable cutters are carried on a floating element and are driven so that the floating element rotates at the same time that the individual cutters rotate.

A further object of this invention is to furnish a simple, practical and improved arrangement and formation of parts in a bit of the type mentioned making the bit suitable for practical use in well drilling, or the like.

The various objects and features of my invention will be best and more fully understood from the following detailed description of a typical form and application of the invention throughout which description I refer to the accompanying drawing, in which.

Figure 1:
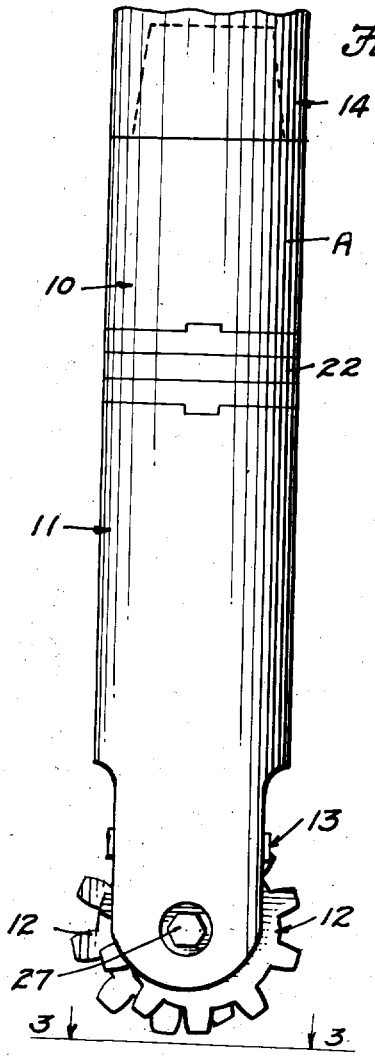
Fig. 1 is a side elevation of the bit provided by this invention showing it applied to the lower end of a string of drill pipe.

The bit furnished by this invention includes, generally, a shank 10, a head 11 rotatably carried by the shank, one or more cutters 12 rotatably carried by the head, and a drive member 13 operated by the shank to drive the cutters 12.

The shank 10 of the bit is adapted to be applied to or connected with the lower end of a string of drill pipe 14 and in practice may be varied considerably in design and construction. For purpose of example I have shown a simple and typical form of shank. In this case the shank is of sectional construction and comprises a top section A, a middle section B, and a bottom section C. The top section A is furnished with an upwardly projecting screw-threaded pin 15 adapted to fit a corresponding socket 16 in a drill collar or other part of the string of drill pipe 14. In practice the top section A may be of the same diameter as the part to which it connects.

The middle section B of the shank is of reduced diameter and projects downwardly from the lower end of the section A. The section B may be formed integral with the section A or it may be a separate part screw threaded to the section A as shown in the drawing.

The section C of the shank is at the lower end of the section B and in the construction shown is somewhat larger in diameter than the section B so that it operates to retain the head 11 on the section B. The shank may be designed so that the section C is integral with the section B or it may be made detachable as shown in the drawing. In practice the several sections of the shank are screw threaded together to form a rigid or solid structure for carrying and operating the other parts of the tool.

The bit illustrated is intended to be used with the rotary method of drilling and therefore the shank is provided with a central longitudinal circulation opening 17 which receives circulating fluid from a string of drill pipe and discharges it at the lower end portion of the shank.

The head 11 is provided as a carrier for the cutting members 12 and is mounted on the shank so that it is free to float or rotate during the drilling operation. The head is rotatably carried on the middle portion B of the shank and is held between the end portions A and C of the shank so that it cannot be displaced from the middle section B. The head has a lower end or extension 20 which extends downwardly over the lower end portion C of the shank.

Figure 2:
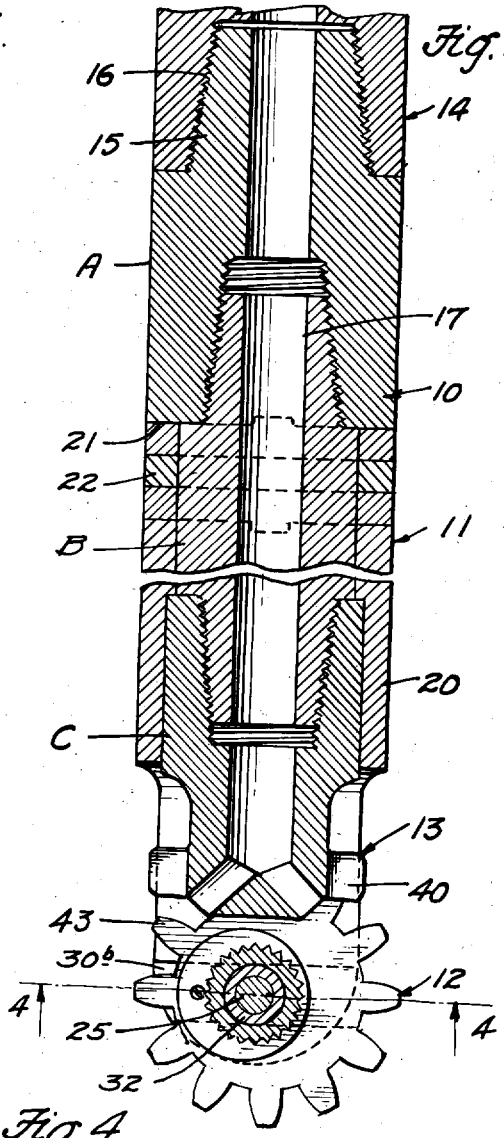
Fig. 2 is an enlarged longitudinal sectional view of the bit.

A suitable thrust bearing is preferably provided between the upper end of the head 11 and the downwardly-facing shoulder 21 presented by the top section A of the shank. This thrust bearing may include a plurality of thrust rings 22 surrounding the middle portion B of the shank, as clearly shown in Figs. 1 and 2 of the drawing. In the preferred construction the rings 22 adjacent the shank section A and the head 11 are keyed to the shank and head so that they are held against relative rotation with reference to these parts.

My present invention provides one or more cutters to be rotatably carried by the head 11 and in accordance with the broader principles of the invention the cutter, or cutters, as the case may be, may be arranged or mounted in various manners and may be of various forms or types. For purpose of example, I have illustrated the bit as including two cutters 12 of the disk type and have shown the cutters arranged in vertical planes so that they drill in a manner similar to the cutters of the standard form of disk bit.

Figure 4:
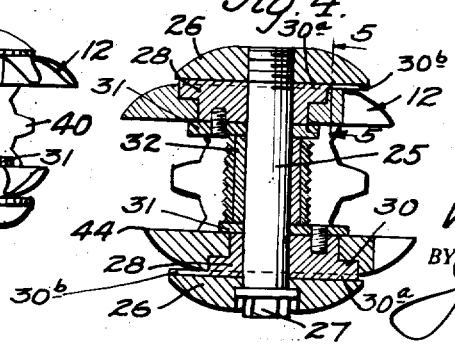
Fig. 4 is a detail section taken as indicated by line 4—4 on Fig. 2.
Figure 5:
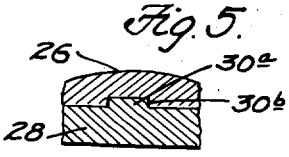
Fig. 5 is a fragmentary view in section as seen on the line 5—5 of Fig. 4 showing the tongue and groove engagement between a lock bushing and a supporting leg of the device.

In the arrangement shown the two cutters 12 are carried on a single mounting pin 25 supported by the head 11. The pin 25 is horizontally disposed and is arranged to intersect the central longitudinal axis of the tool as illustrated in Fig. 4 of the drawing. In the construction shown the downward extension 20 of the head 11 is provided with spaced legs 26 which project downwardly from the part 20 past the lower or bottom section C of the shank to support the pin 25 below the shank, as illustrated in the drawing. The pin 25 may be mounted between the spaced legs 26 of the head in any suitable manner. In the drawing I have shown the pin supported in openings provided in the legs, the pin being supplied at one end with a head 27 engaging one leg and being threaded at the other end to screw thread into the other leg. This construction is illustrated in Fig. 4 of the drawing.

The two cutters 12 are mounted on the pin 25 so that they are offset or spaced in opposite directions from the central axis of the tool. In accordance with the preferred arrangement the cutters may be located adjacent the inner sides of the spaced legs 26. The form of the mounting for the cutters shown in the drawing provides eccentric bushings 28 mounted on the pin 25 to carry the cutters 12. The eccentric bushings are mounted in fixed position on the pin so that they project horizontally in opposite directions causing the pivotal axes of the cutters 12 to be offset in opposite directions horizontal from the axis of the pin 25. The amount of eccentricity of the axes of the bushings is so determined as to insure that the heel of the cutting face of the cutters 12 will be relieved so that the entering face of the cutter will engage the bore without possibility that the heel will cut the back wall as the cutters advance around the longitudinal axis of the drill stem. I have shown key projections 30*a* on the bushings fitting openings 30*b* in the legs to prevent rotation of the bushings on the pins, thus allowing a cutter to rotate around the axis of the bushing on which it is mounted, while the bushing is locked in its eccentric position in a desired plane of eccentricity with relation to the pin 25. I wish to point out that the outer faces or bearing parts of the bushings which carry the cutters may be shaped to carry the cutters in any desired relation with reference to the pin. For example the bearing faces of the bushings may be such as to carry the cutters in planes other than planes perpendicular to the axis of the pin 25. The bushings illustrated are provided with flanges 30 which fit between the cutters and the inner sides of the legs so that the cutters do not wear against the legs. Washers 31 are provided at the inner sides of the cutters to retain the cutters on the bushings and a spacing sleeve 32 is located on the pin 25 between the washers to hold the washers in place. In practice one or more cutter rings or rollers may be rotatably supported on the sleeve 32 between the washers, as illustrated in Fig. 4 of the drawing. Attention is directed to the fact that by providing the rigid structure spanning the distance between the legs 26 and which structure comprises the fixed pin, the bushing locked with relation to the legs, and the interposed sleeve, it is possible to reduce the sectional area of the legs to a minimum, thus insuring great strength for the structure of the cutting head while requiring only a minimum space for the cutter supports.

By reference to the drawing it will be seen that the opposing faces of the spaced legs 26 are parallel and flat and that they are each formed with a keyway 30*b*, one of which extends across the face of each of said legs and intersects the axis of the aligned openings through the legs which receive the pin 25. Due to this arrangement the entire cutter structure may be assembled on a temporary pin which has a length substantially equal to the distance between the plane faces of the legs so that the two cutters 12, the intermediate sleeve 32, and the lock washers 31 may be assembled and moved to their operative position between the legs 26. The pin 25 may then be inserted into the assembled structure so as to force the temporary assembled pin out of position and to allow the structure to be finally assembled as shown particularly in Fig. 4 of the drawing. The pin 25 is screwed into position in one of the legs and will tend to draw these legs together against the opposite ends of the eccentric bushings so that a pressure will be exerted upon this central assembly, including the bushings 28 and 30, the washers 31, and the spacing bushing 32. This action will accomplish two purposes, the first being that of holding the bushings in a rigid assembly to receive the cutters, and the second being that of providing a rigid structure between the legs 26 which will tend to reinforce these legs and to give them strength without requiring that they be of large cross-sectional area.

The cutters 12 are adapted to be driven or rotated from the drive member 13 on the shank, and, in accordance with one of the important features of the invention, the parts are arranged so that there is a direct driving engagement between the drive member and cutters.

The drive member 13 may be formed on or as a part of the shank, for instance it may be formed integral with the bottom section C of the shank. The drive member is in the nature of a drive pinion comprising a plurality of teeth 40 arranged symmetrically about a common center which center may be concentric with the longitudinal axis of the tool. In the arrangement illustrated in the drawing the drive member or pinion 13 is formed on the lower end of the bottom section C of the shank so that it operates between the spaced legs 26 of the head at a point spaced about the pin 25 which carries the cutters.

Figure 3:
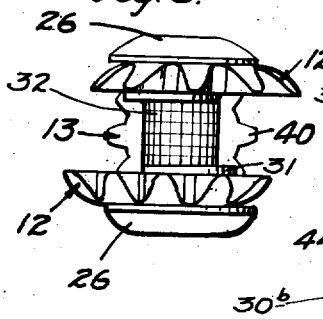
Fig. 3 is an end elevation of the bit being a view taken as indicated by line 3—3 on Fig. 1.

The drive connection between the drive member 13 and cutters may be obtained through various arrangements or formation of parts, it being apparent that a direct driving engagement can be obtained between the member 13 and cutters by providing the cutters with parts to mesh or cooperate with the teeth of the drive member and by properly relating the cutters to the drive member. Where I provide cutters of the disk type as shown in the drawing, it is desirable to serrate or notch their edges or peripheral portions to form teeth 43 to mesh with the teeth 40 of the drive member 13. The cutters are proportioned as to diameter and are mounted on the pin 25 so that their toothed peripheries mesh with the drive pinion at substantially diametrically opposite points, as shown in Figs. 3 and 4 of the drawing. Through this arrangement the cutters 12 are driven or rotated in opposite directions from the pinion or drive member 13.

In the particular case illustrated the disk cutters are plano-convex and are arranged with their flat sides faced inwardly or together. By thus forming the disks their peripheral teeth 43 are pointed or have outer cutting edges 44. It is to be understood that the teeth of the drive pinion and those formed on the cutters mesh more or less freely or loosely allowing the cutters to be offset horizontally as shown in Fig. 4 without interfering with the driving engagement between the pinion and cutters. Further, the loose meshing of the teeth together with the manner in which the teeth mesh with each other at right angles prevents the tool from being choked or clogged with material getting between the teeth. It will be apparent that the teeth, being formed radially on the meshing parts and being engaged at right angles, operate to clean each other the teeth of the pinion operating to push material outwardly from between the teeth 43 of the cutters while the teeth 43 of the cutters operate to push material upwardly from between the teeth 40 of the drive pinion. In practice the teeth of the meshing parts may be hardened or otherwise treated so that they are wear resisting. Further, it will be obvious that the present construction allows the cutting edges 44 or outer portions of the disks to be advantageously dressed or faced with high-grade hard facing material.

From the foregoing description it is believed that the operation of the drill will be fully understood. The drill is applied to the lower end of a string of drill pipe 14 and is lowered into the well to be driven or rotated from the drill pipe. Rotation of the drill pipe causes corresponding rotation of the shank of the drill and the drive member 13, these parts being solid or rigid on the lower end of the string of drill pipe. The rotation of the drive member or pinion 13 produces rotation of the cutters 12 in opposite directions causing the cutters to cut or remove the formation with which they contact. The resistance of the cutters to rotation about their individual axes causes driving or rotation of the head 11 with the cutters about the central vertical axis of the tool. This rotation of the head is in the same direction as the drive member and operates to advance or feed the individually rotating cutters into the formation. Because of the floating or differential action of the head 11, the string of drill pipe 14 can be rotated at a much higher speed than is desirable for the rotation or advancement of the cutters about the vertical axis. Through this action the necessary power can be applied to the cutters by rotating the drill pipe 14 at a higher speed and with less force than is necessary with the ordinary type of drilling tool. In this way the drill pipe is relieved of excessive strain which falls upon a drill pipe when it is rotated slowly and with great force.

As the bit operates the cutters 12 are positively rotated or driven about their individual axes so that they operate as milling cutters and effectively cut the formation. It will be apparent that proper regulation or advancing of the tool will cause the individual cutters and the head to rotate at the proper relative speeds so that the bit drills in a most effective and efficient manner. During the drilling operation the cuttings or foreign matter getting between the teeth of the drive member or cutters are displaced by the meshing action of the teeth 40 and 43 as above described. In other words, the drive pinion and toothed cutters are self-cleaning so that the bit does not mud-up in the manner commonly experienced with bits in which the parts are not positively driven or are not freed of the mud or cuttings present in the bore.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A drill of the character described including, a rotatable drive member, a cutter, and means mounting the cutter for rotation about an axis at substantially right angles to the axis of the drive member and for bodily revolution about the axis of the drive member, the drive member and cutter having meshing teeth, the teeth of the cutter having cutting edges.

2. A well drill including, a vertical shank, a drive member on the lower portion of the shank, a head rotatably mounted on the shank, two cutters and a single pin carried by the head supporting the cutters for rotation on spaced parallel horizontal axes so that they are in cooperative engagement with the drive member at substantially diametrically opposite points.

3. A well drill including, a vertical shank, a drive member on the lower portion of the shank, a head rotatably carried on the shank and having spaced projecting parts, a pin carried between said parts, and a cutter carried on the pin in cooperative engagement with the drive member.

4. A well drill including, a vertical shank, a drive member on the lower portion of the shank, a head rotatably carried on the shank and having spaced projecting parts, a pin carried between said parts, and two cutters rotatably mounted on the pin to cooperatively engage the drive member at opposite sides.

5. A well drill including, a vertical shank, a drive member on the lower portion of the shank, a head rotatably carried on the shank and having spaced projecting parts, a pin carried between said parts, two cutters rotatably mounted on the pin to cooperatively engage the drive member at opposite sides, and a cutter on the pin between said two cutters.

6. A drill of the character described comprising a body member adapted to be mounted at the lower end of a drill stem, downwardly projecting legs formed as a part of said body member and having opposed flat parallel faces, aligned openings through said legs, a keyway formed across the face of each of the flat faces of said legs and intersecting the longitudinal center line of the aligned openings, a pair of circular bushings having eccentric openings therein adapted to register with the aligned openings in the legs of the body member, the outer face of each of said bushings being formed with a projecting tongue adapted to seat within the groove of the contiguous face of a leg whereby said bushings will be held against rotation in its eccentric position, spacing means occupying the space between the inner faces of said eccentric bushings and whereby said bushings will be held in their assembled relation to the legs of the body member, and a pin passing through the legs of the body member, eccentric bushings and spacing means whereby to provide a rigid supporting structure between the legs of the body member for rotary cutters.

7. A drill of the character described comprising a body member adapted to be mounted at the lower end of a drill stem, downwardly projecting legs formed as a part of said body member and having opposed flat parallel faces, aligned openings through said legs, a keyway formed across the face of each of the flat faces of said legs and intersecting the longitudinal center line of the aligned openings, a pair of circular bushings having eccentric openings therein adapted to register with the aligned openings in the legs of the body member, the outer face of each of said bushings being formed with a projecting tongue adapted to seat within the groove of the contiguous face of a leg whereby said bushings will be held against rotation in its eccentric position, spacing means occupying the space between the inner faces of said eccentric bushings and whereby said bushings will be held in their assembled relation to the legs of the body member, and a pin passing through the legs of the body member, eccentric bushings and spacing means whereby to provide a rigid supporting structure between the legs of the body member for rotary cutters, and a pair of rotary cutters concentrically mounted, one upon each of the eccentric bushings, and adapted to rotate with relation thereto.

8. A drill bit of the character described comprising a body member adapted to be mounted at the lower end of a drill stem, downwardly projecting legs formed as a part of said body member and having opposed flat parallel faces, aligned openings extending transversely through said legs, a pair of keyways one extending transversely of the flat face of each of said legs, said keyways lying in the same plane and intersecting the longitudinal axis of the aligned openings through the legs, a pair of bushings each having a flange end lying flat against the flat faces of said legs, each of said ends being formed with a key adapted to fit within the keyway of the contiguous flat face, a pair of drilling cutters, one disposed concentrically of each of said bushings and adapted to rotate therearound, a spacing member occupying the space between the bushings to hold the tongues of the same in engagement with the grooves in the legs, and a bolt passing through the aligned openings of the legs and openings in the bushing whereby to hold the legs, the bushings and the spacing member in fixed and abutting relation to each other.

WALTER A. ABEGG.